United States Patent
Kimura (10) Patent No.: US 9,779,855 B2
(45) Date of Patent: Oct. 3, 2017

(54) SMALL DIAMETER HIGH VOLTAGE INSULATED ELECTRIC WIRE

(71) Applicant: Yazaki Corporation, Tokyo (JP)

(72) Inventor: Shuichi Kimura, Shizuoka (JP)

(73) Assignee: YAZAKI CORPORATION, Minato-ku, Tokyo (JP)

(*) Notice: Subject to any disclaimer, the term of this patent is extended or adjusted under 35 U.S.C. 154(b) by 0 days.

(21) Appl. No.: 14/812,323

(22) Filed: Jul. 29, 2015

(65) Prior Publication Data

US 2015/0340126 A1 Nov. 26, 2015

Related U.S. Application Data

(63) Continuation of application No. PCT/JP2014/051944, filed on Jan. 29, 2014.

(30) Foreign Application Priority Data

Jan. 30, 2013 (JP) ................................. 2013-015616

(51) Int. Cl.

| H01B 7/04 | (2006.01) |
|---|---|
| H01B 7/02 | (2006.01) |
| H01B 3/30 | (2006.01) |
| H01B 7/295 | (2006.01) |

(Continued)

(52) U.S. Cl.
CPC ............ H01B 7/02 (2013.01); C08L 23/0869 (2013.01); H01B 3/307 (2013.01); H01B 3/441 (2013.01); H01B 3/447 (2013.01); H01B 7/04 (2013.01); H01B 7/295 (2013.01)

(58) Field of Classification Search
USPC ....................................................... 174/110 A
See application file for complete search history.

(56) References Cited

U.S. PATENT DOCUMENTS 9,406,413 B2 * 8/2016 Kogo ..................... H01B 7/295
2010/0057001 A1 3/2010 Chen et al.

FOREIGN PATENT DOCUMENTS

| CN | 86102297 A | 10/1986 |
|---|---|---|
| CN | 85101356 A | 1/1987 |
| JP | 2525982 B2 | 8/1996 |

(Continued)

OTHER PUBLICATIONS

Communication dated May 4, 2016 from the State Intellectual Property Office of the P.R.C. in counterpart application No. 201480006740.4.

(Continued)

Primary Examiner — Timothy Thompson
Assistant Examiner — Krystal Robinson
(74) Attorney, Agent, or Firm — Sughrue Mion, PLLC (57) ABSTRACT

A thin high-voltage insulted electric wire which comprises a conductor and an insulating layer covering the conductor, said insulating layer comprising both an ethylene-acrylic ester copolymer resin and polyethylene. The insulating layer is made of a composition which exhibits a reciprocal of the product of tensile break strength ($\sigma f$) (MPa) and tensile break elongation ($\epsilon$), $1/(\sigma f \cdot \epsilon)$, of $4.8 \times 10^{-2}$ or less [wherein $\sigma f$ refers to the tensile break strength of the insulating layer and $\epsilon$ refers to the tensile break elongation thereof], a storage elastic modulus (E) of 520 MPA or more, and a D hardness of 45 or more.

3 Claims, 6 Drawing Sheets

(51) Int. Cl.
   *H01B 3/44*   (2006.01)
   *C08L 23/08*  (2006.01)

(56) References Cited

FOREIGN PATENT DOCUMENTS

| JP | 2909576 | B2 |   | 6/1999 |
| --- | --- | --- | --- | --- |
| JP | 2000-319460 | A |   | 11/2000 |
| JP | 3439352 | B2 |   | 8/2003 |
| JP | 2004-175860 | A |   | 6/2004 |
| JP | 2005-314516 | A |   | 11/2005 |
| JP | 2005314516 | A | * | 11/2005 |
| JP | 2011-1506 | A |   | 1/2011 |
| JP | 2012-501730 | A |   | 1/2012 |
| JP | 2012-104227 | A |   | 5/2012 |
| JP | 2012221610 | A |   | 11/2012 |
| WO | 86/05623 | A1 |   | 9/1986 |
| WO | 2010/027588 | A2 |   | 3/2010 |

OTHER PUBLICATIONS

Kenkichi Murakami, Rheology Kisoron, first edition, Sangyo Tosho Kabushiki Kaisha, May 30, 1991, pp. 129 and 148.
International Search Report for PCT/JP2014/051944 dated Mar. 25, 2014 [PCT/ISA/210].
Written Opinion for PCT/JP2014/051944 dated Mar. 25, 2014 [PCT/ISA/237].
Communication dated Dec. 21, 2016, from the State Intellectual Property Office of People's Republic of China in counterpart Application No. 201480006740.4.
Communication dated Jan. 17, 2017, from the Japanese Patent Office in counterpart application No. 2013-015616.
Communication dated Apr. 4, 2017, issued from the Japan Patent Office in counterpart Japanese Application No. 2013-015616.
Communication dated Jun. 8, 2017 from the State Intellectual Property Office of the P.R.C. in counterpart Application No. 201480006740.4.

* cited by examiner

FIG. 1

| | Example 1 | Example 2 | Example 3 | Comparative Example 1 | Comparative Example 2 | Comparative Example 3 | Comparative Example 4 |
|---|---|---|---|---|---|---|---|
| Electric Wire Structure (Insulator Wall Thickness) | ISO Conductor Size 3mm²(3sq) Thin Wall (0.4mm) | | | 3mm²(3sq) Thin Wall (0.4mm) | | 3mm²(3sq) Thick Wall (0.7mm) | |
| Ethylene-Ethyl Acrylate A | 75 | 60 | 55 | | | 75 | |
| Ethylene-Ethyl Acrylate B | | | | 75 | 90 | | 90 |
| Modified PE or HDPE | 25 | 40 | 45 | 25 | 10 | 25 | 10 |
| Mg(OH)$_2$ | 20 | 20 | 20 | 20 | 20 | 20 | 20 |
| $1/\sigma f \varepsilon$ | $4.8 \times 10^{-2}$ | $3.5 \times 10^{-2}$ | $1.9 \times 10^{-2}$ | $5.2 \times 10^{-2}$ | $5.5 \times 10^{-2}$ | $4.8 \times 10^{-2}$ | $5.5 \times 10^{-2}$ |
| Storage Elastic Modulus | 520 | 860 | 1012 | 400 | 338 | 520 | 240 |
| Hardness | 45 | 48 | 52 | 44 | 41 | 45 | 38 |
| Wear Resistance | 1.0 | 1.1 | 1.6 | 0.9 | 0.7 | 2.3 | 1.2 |
| Flexibility | 0.7 | 0.8 | 1.0 | 0.7 | 0.5 | 1.8 | 1.0 |

FIG. 2

| ISO Conductor | | Thick Wall | | | Thin Wall | | | Ultrathin Wall | | |
|---|---|---|---|---|---|---|---|---|---|---|
| Size | Diameter | Insulator Thickness | | Wire Outer Diameter | Insulator Thickness | | Wire Outer Diameter | Insulator Thickness | | Wire Outer Diameter |
| mm² | mm | mm | | mm | mm | | mm | mm | | mm |
| | Maximum | Nominal | Minimum | Maximum | Nominal | Minimum | Maximum | Nominal | Minimum | Maximum |
| 0.13 | 0.55 | | | | 0.25 | 0.20 | 1.05 | 0.20 | 0.16 | 0.95 |
| 0.22 | 0.70 | | | | | | 1.20 | | | 1.05 |
| 0.35 | 0.90 | | | | | | 1.40 | | | 1.20 |
| 0.50 | 1.10 | 0.60 | 0.48 | 2.30 | 0.28 | 0.22 | 1.60 | | | 1.40 |
| 0.75 | 1.30 | | | 2.50 | 0.30 | 0.24 | 1.90 | | | 1.60 |
| 1 | 1.50 | | | 2.70 | | | 2.10 | | | 1.75 |
| 1.25 | 1.70 | | | 2.95 | | | 2.30 | | | 2.00 |
| 1.5 | 1.80 | | | 3.00 | | | 2.40 | | | 2.10 |
| 2 | 2.00 | | | 3.30 | 0.35 | 0.28 | 2.80 | 0.25 | 0.20 | 2.40 |
| 2.5 | 2.20 | 0.70 | 0.56 | 3.60 | | | 3.00 | | | 2.70 |
| 3 | 2.40 | | | 4.10 | | | 3.40 | | | |
| 4 | 2.80 | | | 4.40 | | | 3.70 | | | |
| 5 | 3.10 | 0.80 | 0.64 | 4.90 | 0.40 | 0.32 | 4.20 | | | |
| 6 | 3.40 | | | 5.00 | | | 4.30 | | | |
| 8 | 4.30 | | | 5.90 | | | 5.00 | | | |
| 10 | 4.50 | | | 6.50 | 0.60 | 0.48 | 6.00 | | | |
| 12 | 5.40 | 1.00 | 0.80 | 7.40 | | | 6.50 | | | |
| 16 | 5.80 | | | 8.30 | | | 7.20 | | | |
| 20 | 6.90 | 1.10 | 0.88 | 9.10 | 0.65 | 0.52 | 7.80 | | | |
| 25 | 7.20 | | | 10.40 | | | 8.70 | | | |
| 30 | 8.30 | 1.30 | 1.04 | 10.90 | 0.80 | 0.64 | 9.60 | | | |
| 35 | 8.50 | | | 11.60 | | | 10.40 | | | |
| 40 | 9.60 | 1.40 | 1.12 | 12.40 | 0.90 | 0.71 | 11.10 | | | |
| 50 | 10.50 | | | 13.50 | | | 12.20 | | | |
| 60 | 11.60 | 1.50 | 1.20 | 14.60 | 1.00 | 0.80 | 13.30 | | | |
| 70 | 12.50 | | | 15.50 | | | 14.40 | | | |
| 95 | 14.80 | 1.60 | 1.28 | 18.00 | 1.10 | 0.90 | 16.70 | | | |
| 120 | 16.50 | | | 19.70 | | | | | | |

Sand Paper Wear

| ISO Conductor Size mm2 | 60V Thick Wall | | 60V Thin Wall | | 60V Ultrathin Wall | | 600V | |
|---|---|---|---|---|---|---|---|---|
| | Additional Mass kg | Sand Paper Minimum Length mm | Additional Mass kg | Sand Paper Minimum Length mm | Additional Mass kg | Sand Paper Minimum Length mm | Additional Mass kg | Sand Paper Minimum Length mm |
| 0.13 | ✕ | ✕ | 0.1 | 200 | 0.05 | 150 | 0.5 | 400 |
| 0.22 | | | | 225 | | 175 | | |
| 0.35 | | | | 250 | | 200 | | |
| 0.5 | 0.5 | 400 | 0.2 | 300 | 0.1 | 175 | | |
| 0.75 | | 410 | | 350 | | 200 | | 410 |
| 1 | | 420 | | 400 | | 225 | | 420 |
| 1.25 | | 425 | | 425 | | 240 | | 425 |
| 1.5 | | 430 | | 450 | | 250 | | 430 |
| 2 | | 450 | | 500 | | 275 | | 450 |
| 2.5 | 1.5 | 280 | 0.5 | 250 | 0.2 | 125 | 1.5 | 280 |
| 3 | | 330 | | 300 | ✕ | ✕ | | 330 |
| 4 | | 400 | | 350 | | | | 400 |
| 5 | | 450 | | 430 | | | | 450 |
| 6 | | 500 | | 500 | | | | 500 |

FIG. 5

Prescribed Values of Bending Stress Test

| Nominal Cross-Sectional Area of Conductor | mm² | 0.22 | 0.35 | 0.5 | 0.75 | 1.0 | 1.5 | 2.5 | 4.0 | 6.0 |
|---|---|---|---|---|---|---|---|---|---|---|
| Sample Length | mm | 50 | | | | | 70 | | | |
| Number of Samples n | | 5 | | | | | 3 | | | |
| Distance lv | mm | 20 | | | | | 30 | | | |
| Maximum Bending Stress | N | 15 | 15 | 20 | 25 | 30 | 30 | 40 | 70 | 90 |

FIG. 6

Prescribed Values of Standard Procedure

| Nominal Cross-Sectional Area of Conductor | mm² | 10 | 16 | 25 | 35 | 50 | 70 | 95 |
|---|---|---|---|---|---|---|---|---|
| Sample Length l | mm | 150 ||||||||
| Number of Samples n | | 1 |||||||
| Distance lv | mm | 100 |||||||
| Maximum Bending Stress | N | 15 | 20 | 30 | 50 | 70 | 90 | 110 |

FIG. 7

SMALL DIAMETER HIGH VOLTAGE INSULATED ELECTRIC WIRE

CROSS REFERENCE TO RELATED APPLICATIONS

This application is a Continuation of PCT Application No. PCT/JP2014/051944, filed on Jan. 29, 2014, and claims the priority of Japanese Patent Application No. 2013-015616, filed on Jan. 30, 2013, the content of both of which is incorporated herein by reference.

BACKGROUND

Technical Field

The present invention relates to a high voltage wire and relates particularly to a small diameter high voltage insulated electric wire excellent in flexibility and wear resistance.

Related Art

A high voltage wire as a component of a wire harness used in a high voltage portion of a hybrid vehicle, an electric vehicle, and so on is required to have heat aging resistance (heat-resistant life), flexibility, wear resistance, and so on. Along with downsizing of equipment and apparatuses, the high voltage wire is required to be lightened and further required to have a small diameter so as to be arranged in a narrow space. In order to reduce environmental load, the high voltage wire is furthermore required to be made of a halogen-free material containing no halogenated substance.

As a conventionally used high voltage wire, there has been proposed a cross-linked thin-walled wire which has an insulating layer formed of a flame retardant, which may be a non-halogenated flame retardant such as magnesium hydroxide, in ethylene copolymer resin such as ethylene-ethyl acrylate copolymer resin (EEA) and ethylene-vinyl acetate copolymer resin (EVA) (refer to JP 2525982 B2). However, the heat-resistant temperature of the cross-linked thin-walled wire is insufficient when this wire is used in a high voltage portion for a hybrid vehicle and an electric vehicle. Further, it is predicted that the composition of the cross-linked thin-walled wire does not satisfy required wear resistance.

As a conventionally used high voltage wire, there has been proposed a cross-linked heat-resistant wire which has an insulating layer, consisting of a bromine-based flame retardant and an antioxidant, in thermoplastic polyester (refer to JP 3439352 B2). However, since the cross-linked heat-resistant wire uses the bromine-based flame retardant, a high voltage wire is not made of a halogen-free material. The cross-linked heat-resistant wire has poor flexibility due to its high elasticity, and this electric wire is hardly wired and difficult to handle.

As a conventionally used high voltage wire, a cross-linked heat-resistant wire which has an insulating layer of fluororesin has been proposed (refer to JP 2909576 B2). However, since the cross-linked heat-resistant wire uses fluororesin, although the electric wire has sufficient heat resistance, the cost is high, and the flexibility is poor.

A heat aging resistance problem is that polyethylene (PE) and polypropylene (PP) cannot satisfy the heat aging resistance at 150° C. for 3000 hours. In order to address the heat aging resistance problem, a highly heat-resistant resin such as engineering plastic-type resins and super engineering plastic-type resins is required to be used. However, the highly heat-resistant resin is hard to significantly reduce flexibility and, in addition, is expensive; therefore, it is difficult to use the highly heat-resistant resin alone in an electric wire insulator.

A flexibility problem is that flexibility and wear resistance are in tradeoff relationship with each other, and in order to improve the wear resistance, a high voltage wire is often formed of a high elastic modulus material as a hard resin component; therefore, the flexibility cannot be secured. If the high voltage wire is used in an environment where high voltage is applied, the high voltage wire having a larger size is used, so that the hardness of the high voltage wire is further increased, and workability cannot be secured.

As a wear resistance problem, the wear resistance is improved by reducing an amount of filler. However, in order to secure flame retardance, a halogenated flame retardant is required to be used. The use of the halogenated flame retardant increases environmental load, as described above, and thus it is not preferable. In addition, since the halogenated flame retardant is expensive, it is unsuitable for use in a high voltage wire. Since the wear resistance is reduced by thinning an electric wire structure, it is difficult to maintain wear resistance in a high voltage wire having a narrowed diameter.

A halogen-free problem is that the use of a bromine-based flame retardant provides an effect of obtaining a high level of flame retardance and improving wear resistance. However, the bromine-based flame retardant contains a halogen substance to increase environmental load, and therefore, it is not preferable to use the bromine-based flame retardant.

SUMMARY OF THE INVENTION

In view of the above problems, the present invention provides a small diameter high voltage insulated electric wire which is flexible and highly resistant to wear and allows reduction of environmental load.

According to one aspect of the present invention, a small diameter high voltage insulated electric wire includes a conductor covered with an insulating layer and applied to a system with a nominal system voltage specified by ISO-6722-1, wherein the insulating layer contains a copolymer resin of ethylene and acrylic ester and polyethylene, and when $\sigma f$ (MPa) denotes a tensile break strength and dimensionless quantity $\epsilon$ denotes a break elongation, the insulating layer is a composition having a product $1/(\sigma f \cdot \epsilon)$ of the inverse of the tensile break strength $\sigma f$ and the inverse of the break elongation $\epsilon$ being $4.8 \times 10^{-2}$ or less, and having a value of storage elastic modulus E being 520 MPa or more, and having a D hardness being 45 or more, and in the insulating layer, 10 parts by weight or more and 60 parts by weight or less of a flame retardant is blended with 100 parts by weight of base resin.

The present invention provides a small diameter high voltage insulated electric wire which is flexible and highly resistant to wear and allows reduction of environmental load.

DESCRIPTION OF EMBODIMENTS

Embodiment

In a small diameter high voltage insulated electric wire according to an embodiment of the present invention, a conductor is covered by an insulating layer. The insulating layer contains a copolymer resin of ethylene and acrylic ester and polyethylene and is a composition of matter in which if tensile break strength is σf (MPa) and break elongation is ε, an inverse $1/(\sigma f \cdot \varepsilon)$ of a product of the tensile break strength σf and the break elongation ε is $4.8 \times 10^{-2}$ or less, the value of storage elastic modulus E is 520 MPa or more, and the D hardness is 45 or more.

In the small diameter high voltage insulated electric wire according to the present embodiment, in order to enhance the flexibility, wall thickness (thickness) of an insulating layer is reduced, and an olefin-based resin is used as a base resin without using a very hard and elastic resin represented by engineering plastic-type resins, whereby flexibility is ensured. The insulating layer has a thin wall thickness specified by ISO-6722-1.

The resin component of the insulating layer can further contain polyethylene. If the composition of the resin component is adjusted, the wear resistance, the flexibility, and the heat aging resistance in tradeoff relationship can be simultaneously achieved at a high level. As for a specific composition of the resin component, it is preferable that polyethylene is contained in an amount of 50 parts by weight or less (including no addition (0 part by weight)), ethylene copolymer resin is contained in an amount of 50 to 90 parts by weight, and modified polyethylene is contained in an amount of 20 parts by weight or less (including no addition (0 part by weight)). It is further preferable that polyethylene is contained in an amount of 10 to 30 parts by weight, ethylene copolymer resin is contained in an amount of 70 to 90 parts by weight, and modified polyethylene is contained in an amount of 1 to 10 parts by weight. If the amount of polyethylene is more than 50 parts by weight, heat aging resistance and flexibility are significantly deteriorated, thus causing difficulty in achieving a target value. If the amount of ethylene copolymer resin is less than 50 parts by weight, heat aging resistance and flexibility are significantly deteriorated, thus causing difficulty in achieving a target value. If the amount of ethylene copolymer resin is more than 90 parts by weight, wear resistance is significantly deteriorated, thus causing difficulty in achieving a target value. If the amount of modified polyethylene is more than 20 parts by weight, flexibility is significantly deteriorated, thus causing difficulty in achieving a target value.

In the present embodiment, a metal hydroxide flame retardant is used. If the composition of metal hydroxide is adjusted, a high level of flame retardance and cost reduction can be achieved. As a specific composition of metal hydroxide, 10 to 60 parts by weight is preferred, and 20 to 40 parts by weight is more preferred. Magnesium hydroxide can be used as metal hydroxide.

As antioxidants, one or plural kinds of a hindered phenolic antioxidant, a phosphite antioxidant, and a sulfuric antioxidant can be used. If the composition of the antioxidants is adjusted, characteristics and cost can be simultaneously achieved at a high level. As a specific composition of the antioxidants, the total amount is preferably 1 to 10 parts by weight and more preferably 2 to 6 parts by weight.

In the small diameter high voltage insulated electric wire according to the present embodiment, in order to reduce environmental load, a halogen-free material containing no halogenated substance is blended. In order to blend the halogen-free material, a metal hydroxide flame retardant is used as a flame retardant. In order to reduce the specific gravity of the metal hydroxide flame retardant, it is preferable that the additive amount is reduced as much as possible.

The small diameter high voltage insulated electric wire according to the present embodiment has heat resistance corresponding to a temperature of Class D (150° C.) or more specified by ISO-6722-1. Further, in the small diameter high voltage insulated electric wire according to this embodiment, an allowable voltage is 1000 V or less.

In the small diameter high voltage insulated electric wire according to the present embodiment, in order to improve the wear resistance, it is preferable to minimize an amount of a filler component. The reason why the amount of the filler component is minimized is that addition of a large amount of a filler causes introduction of a large amount of voids (minute defects) into an insulating layer, so that the filler desorbed when an electric wire has been worn acts as an abrasive to reduce wear resistance. Thus, in order to maintain wear resistance, compatibility between the filler and a resin is enhanced to prevent desorption, and, thus, to prevent agglomeration of the filler. Specifically, an ethylene copolymer resin such as ethylene-acrylic ester copolymer, which has low crystallinity and good incorporability of the filler is used as a base resin. In addition, modified polyethylene having good compatibility with this base resin and chemically bonded to metal hydroxide is used as a substitute for the base resin. The ethylene copolymer resin and the modified polyethylene are less expensive than engineering plastic-type resins and are suitable for practical use of an electric wire insulator. In metal hydroxide, in order to prevent agglomeration and dispersion failure while remaining a hydroxyl group in a surface layer, metal hydroxide whose surface has been treated with a silane coupling agent is used.

Figure 2:
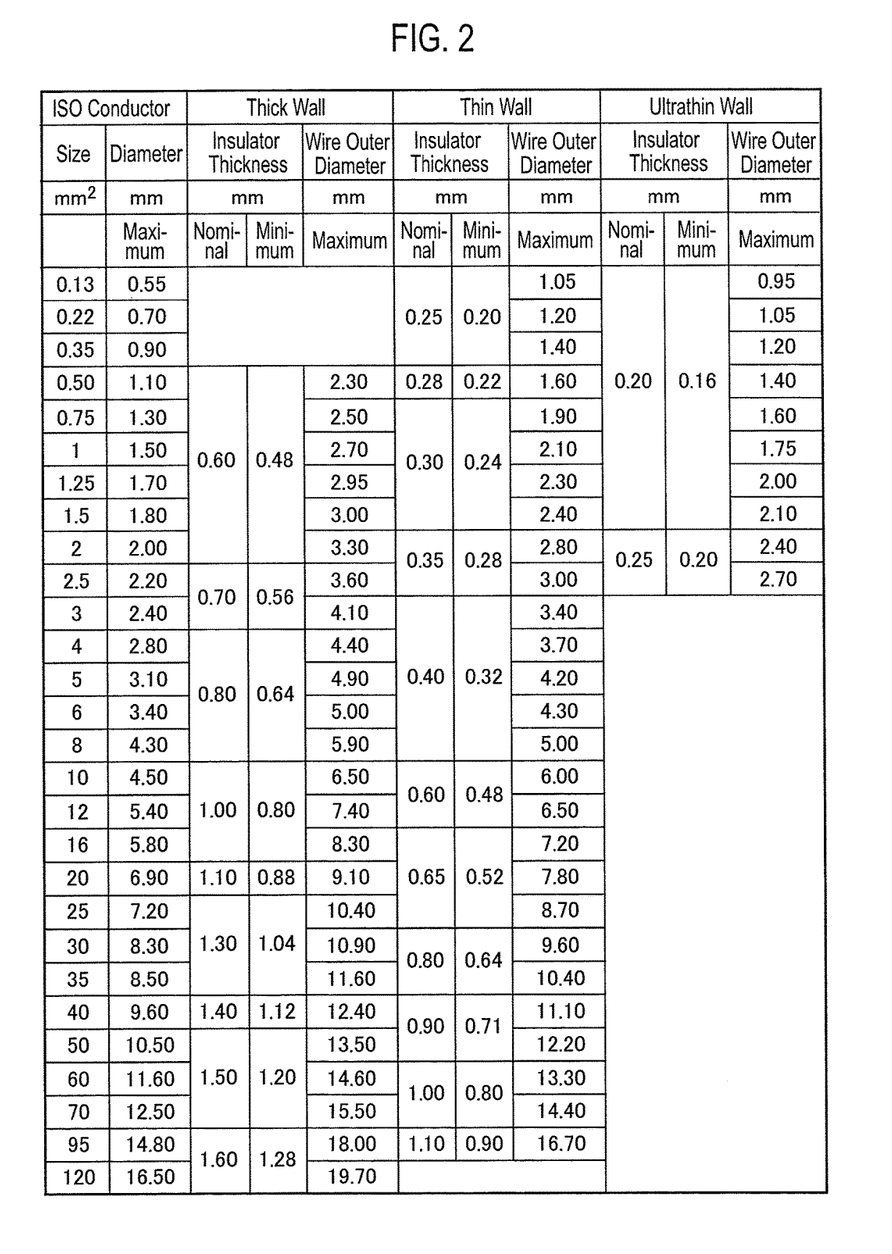
FIG. 2 is a table showing prescribed values of a thin-walled structure specified by ISO-6722-1.

Here are small diameter high voltage insulated electric wires of Examples 1 to 3 according to the present embodiment and Comparative Examples 1 to 4 to be compared with Examples 1 to 3. As shown in FIG. 2, the small diameter high voltage insulated electric wires of Examples 1 to 3 and Comparative Examples 1 to 4 each have an ISO conductor size of 3 mm² (3 sq) specified by ISO-6722-1. Insulator wall thickness (insulator thickness) of each of the small diameter high voltage insulated electric wires of Examples 1 to 3 and Comparative Examples 1 and 2 is so small as nominally 0.4 mm, and the insulator wall thickness of each of the small diameter high voltage insulated electric wires of Comparative Examples 3 and 4 is so large as nominally 0.7 mm. The characteristics of the small diameter high voltage insulated electric wires to be tested in Examples and Comparative Examples include, if the tensile break strength is σf (MPa) and the break elongation is ε, an inverse $1/(\sigma f \cdot \varepsilon)$ of a product of the tensile break strength σf and break elongation ε, storage elastic modulus E, hardness, wear resistance, and flexibility. The test results of Examples 1 to 3 and Comparative Examples 1 to 4 are shown in Table 1.

As a method of verifying the inverse $1/(\sigma f \cdot \epsilon)$ of the product of the tensile break strength σf and the break elongation ε, a tensile test was conducted using a method based on the specification of JIS K 7161, and values of tensile break strength and elongation in an obtained stress-strain curve were used.

The storage elastic modulus E was tested by a method based on the specification of JIS K 7244, and a tensile mode was selected as a deformation mode. In this measurement, TRITECH 2000B manufactured by PerkinElmer Co., Ltd. was used. The D hardness was tested by a method based on the specification of JIS K 7215. A pressure reference plane of a durometer was pressed against a sample surface, and a value measured after 10 seconds was defined as the D hardness.

$$HDD = 100 - 40h$$

HDD: D hardness measured by durometer, and h: hollow depth

Figure 3:
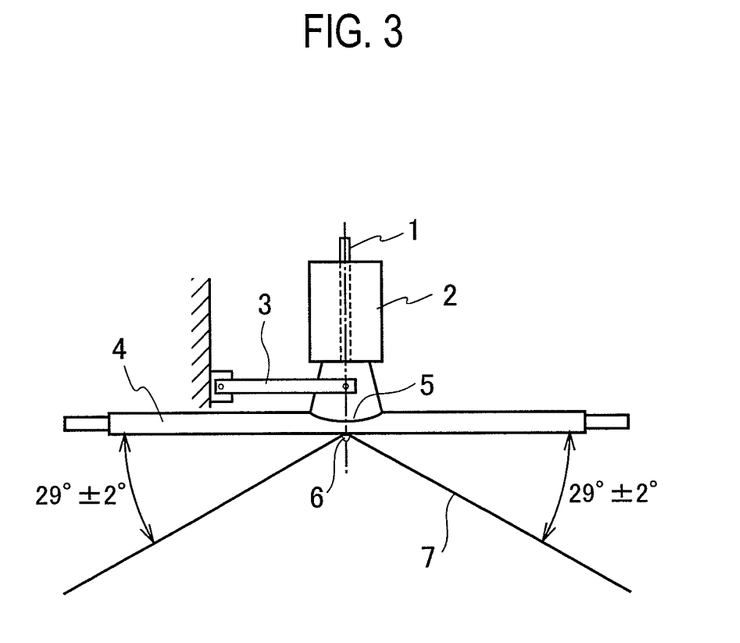
FIG. 3 is a schematic diagram of an apparatus for sandpaper wear test, which is used in a wear resistance test specified by ISO-6722-1.
Figure 4:
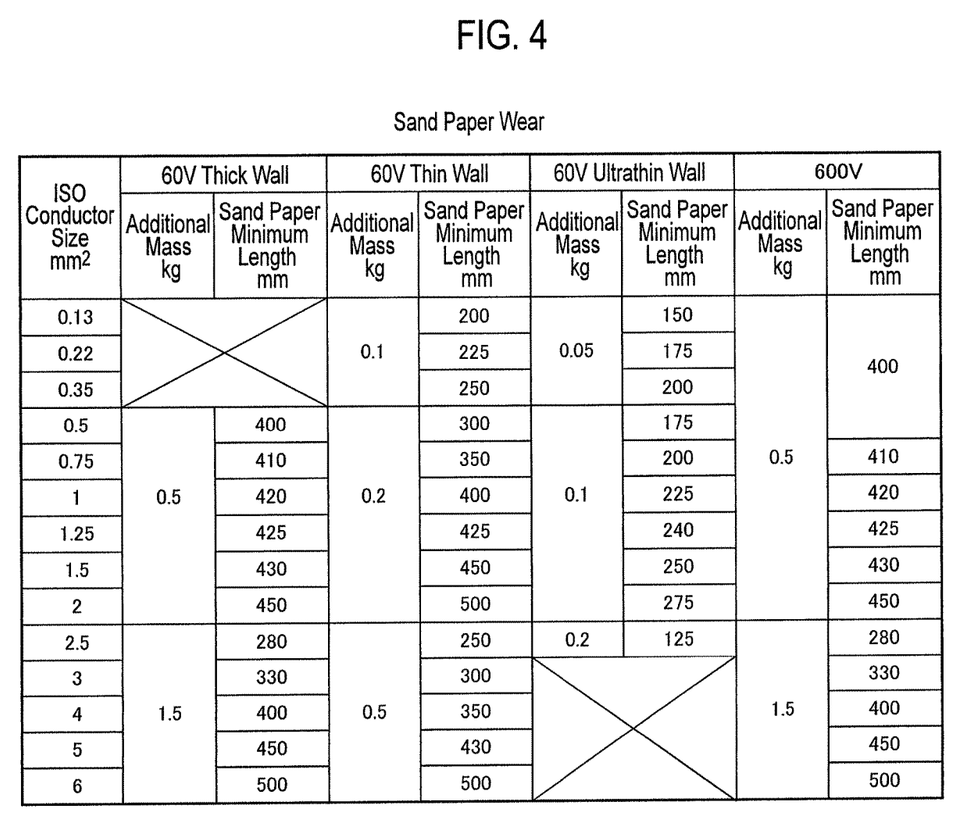
FIG. 4 is a table showing prescribed values of the wear resistance test specified by ISO-6722-1.

The wear resistance is tested by a method based on ISO-6722-1. In the wear resistance test, "sandpaper wear resistance" is measured using 150J garnet sandpaper with 5 mm to 10 mm conductive strips perpendicular to the edge of the sandpaper spaced a maximum of every 75 mm. As shown in FIG. 3, a suitable bracket 5 is attached to a pivot arm 3 so that a test sample 4 is located on an unused portion of a sandpaper wear tape 7. (0.63±0.05) N force is applied to the test sample 4 by a combination of the bracket 5, a support rod 1, and the pivot arm 3. A total of a perpendicular force applied to the test sample 4 corresponds to a combination of the bracket 5, the pivot arm 3, the support rod 1, and an additional mass 2. The additional mass 2 is determined based on the table of FIG. 4. For example, when an ISO conductor size is 3 mm² and the insulator wall thickness is large, the additional mass is 1.5 kg. The test sample 4 is stretched without being extended, using an unused portion of the wear tape and is installed horizontally. The additional mass 2 and the bracket 5 are put on the test sample. The sandpaper wear tape 7 located below the test sample is held by a tape support pin 6 having a diameter of 6.9 mm and pulled at a speed of (1500±75) mm/min, and the length of the sandpaper wear tape 7 is recorded until a conductor is exposed. The test sample 4 is moved by 50 mm and rotated by 90° clockwise. This procedure is repeated, and measurement is performed four times in total. An average of measured values is defined as a sandpaper wear resistance value. As a method of testing wear resistance, the wear resistance is represented by an index obtained when a target value (330 mm) of the sandpaper wear resistance value is defined as 1.0, and it is judged that the test sample has suitable wear resistance if the sandpaper wear resistance value is 1.0 or more.

Figure 5:
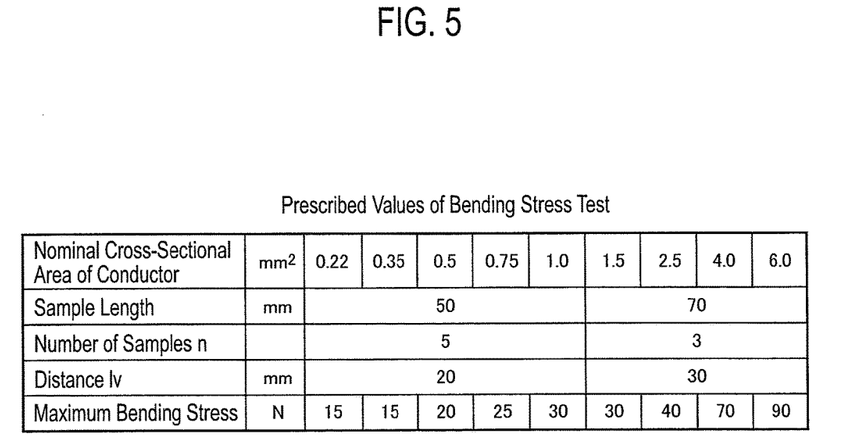
FIG. 5 is a table showing prescribed values of a bending stress test for a flexibility test specified by LV112.
Figure 6:
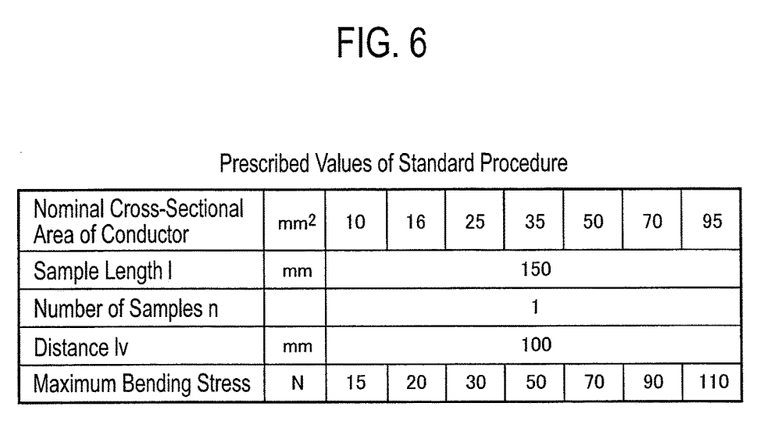
FIG. 6 is a table showing prescribed values of a standard procedure for the flexibility test specified by LV112.
Figure 7:
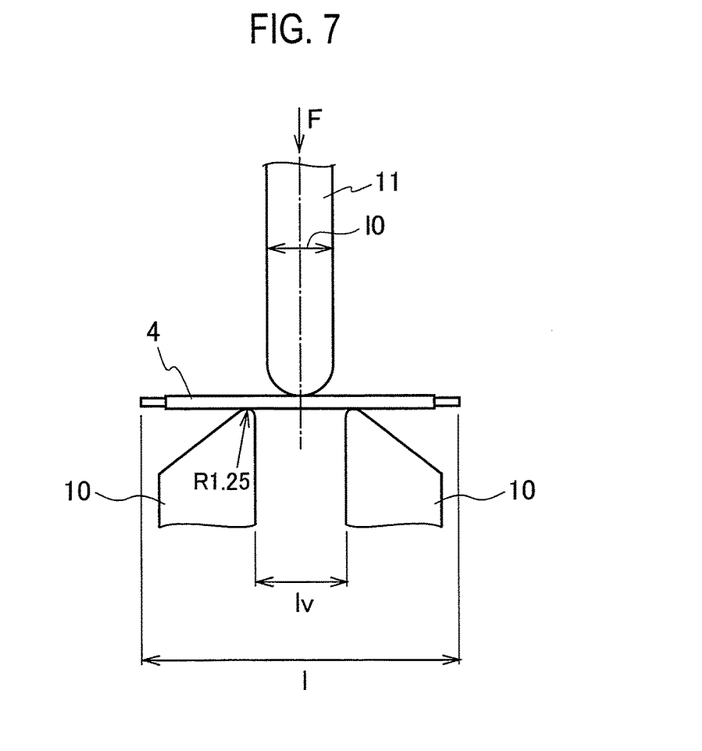
FIG. 7 is a schematic diagram of a tensile testing machine for the flexibility test specified by LV112.

The flexibility is tested by a method based on LV112. Prescribed values of a bending stress test are shown in FIG. 5, and prescribed values of a standard procedure are shown in FIG. 6. In this test, as shown in FIG. 7, a test device is constituted of two legs 10, a test mandrel 11, and a tensile testing machine (not shown). The test samples 4 (the number n and the length are based on FIGS. 5 and 6) are held in an upright state and stored for 16 hours while maintaining the upright state. After that, the test sample 4 is placed so as to be adjacent to the metal legs 10 maintaining a distance 1 v based on FIGS. 5 and 6. Right and left front ends of those samples are marked vertically to a longitudinal wire axis, using a felt pen. In the tensile testing machine, the test mandrel 11 is pressed against the test sample (electric wire) 4 at a testing speed of 100 mm/min, and stress required to bend the test sample 4 is measured. Then, the test sample 4 is straightened to be placed on the leg 10 again, and, thus, to measure again the stress required bending the test sample 4. An average value of the two measured values specifies bending stress. As a method of testing flexibility, the flexibility is represented by an index obtained when a target value (40 N) of the bending stress is defined as 1.0, and it is judged that the test sample has suitable flexibility if the bending stress is 1.0 or less.

Example 1

The small diameter high voltage insulated electric wire according to Example 1 contains, as an insulating layer, 75 parts by weight of ethylene-ethyl acrylate A (Rexpearl A1100; Japan Polyethylene Corporation) as ethylene copolymer resin, 25 parts by weight of modified polyethylene (modified PE) (ET220X; Japan Polyethylene Corporation), and 20 parts by weight of silane coupling treated Mg(OH)$_2$ (V6; Konoshima Chemical Co., Ltd.) as metal hydroxide. The small diameter high voltage insulated electric wire according to Example 1 further contains a phenolic antioxidant (Irganox1010; BASF) and a phosphite antioxidant (IRGAFOS168; BASF) as an insulating layer.

As for the test results of the small diameter high voltage insulated electric wire according to Example 1, in the determination of the wear resistance, since the index is 1.0, this small diameter high voltage insulated electric wire has suitable wear resistance. In the determination of the flexibility, since the index is 0.7, this small diameter high voltage insulated electric wire has suitable flexibility. Since the small diameter high voltage insulated electric wire according to Example 1 has been determined to be suitable based on all the test results, the composition of matter of the insulating layer used in this electric wire is suitable.

The characteristics of the composition of matter of the insulating layer of Example 1 that could achieve the target values of the wear resistance and the flexibility are as follows. The inverse $1/(\sigma f \cdot \epsilon)$ of the product of the tensile break strength σf and the break elongation ε is $4.8 \times 10^{-2}$. The value of the storage elastic modulus E is 520 MPa. The D hardness is 45.

Figure 1:
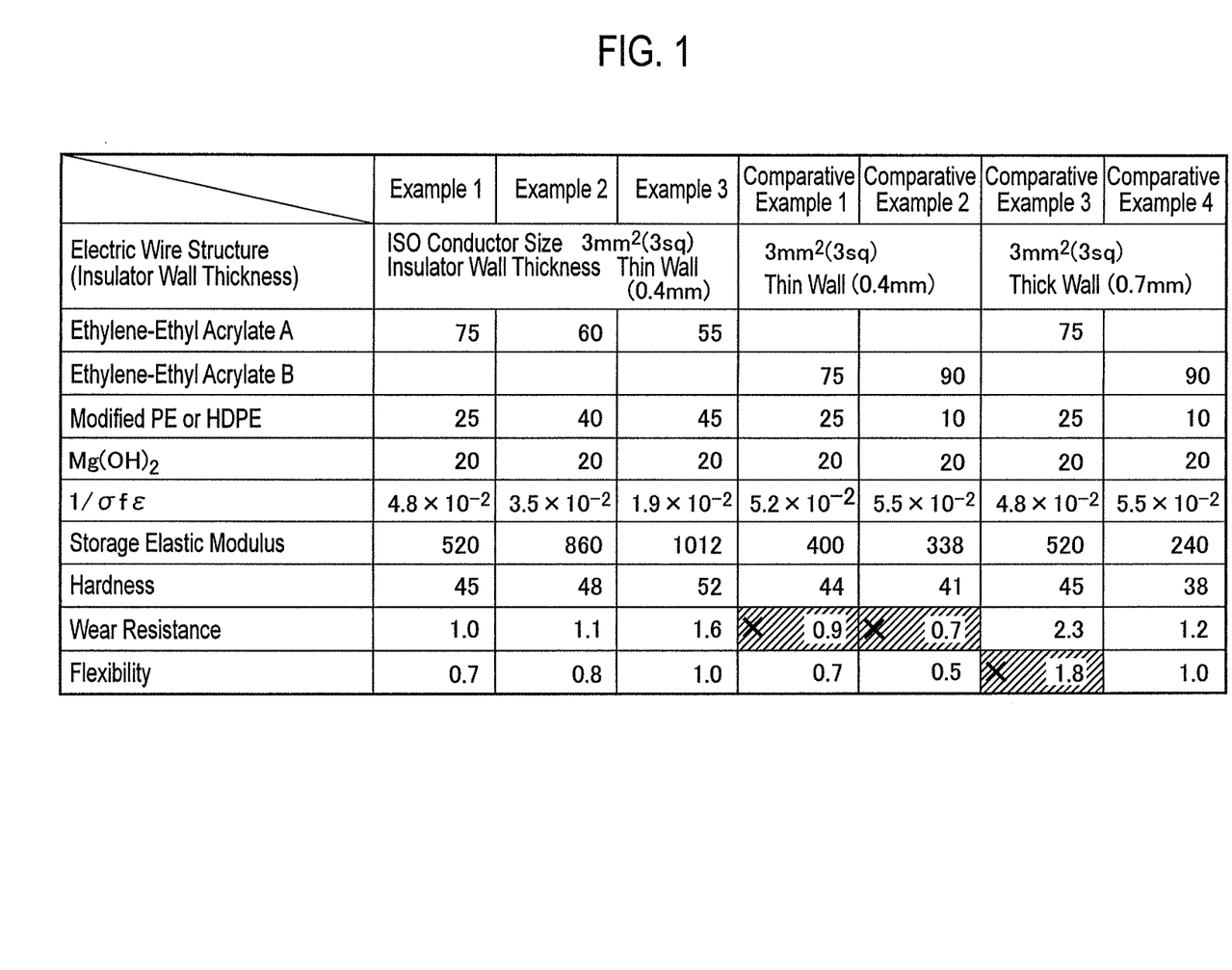
FIG. 1 is a table showing results of evaluation and verification of Examples and Comparative Examples of a small diameter high voltage insulated electric wire according to an embodiment of the present invention.

Although the determination of the heat-resistant life is not shown in FIG. 1, since the temperature is 160° C. that is than Class D or more specified by ISO-6722-1, the small diameter high voltage insulated electric wire according to Example 1 has a suitable heat-resistant life.

Example 2

The small diameter high voltage insulated electric wire according to Example 2 contains, as an insulating layer, 60 parts by weight of ethylene-ethyl acrylate A (Rexpearl A1100; Japan Polyethylene Corporation) as ethylene copolymer resin, 40 parts by weight of modified polyethylene (modified PE) (ET220X; Japan Polyethylene Corporation), and 20 parts by weight of silane coupling treated Mg(OH)$_2$ (V6; Konoshima Chemical Co., Ltd.) as metal hydroxide. The small diameter high voltage insulated electric wire according to Example 2 further contains a phenolic antioxidant (Irganox1010; BASF) and a thioether antioxidant (AO-412S; ADEKA Corporation) as an insulating layer.

As for the test results of the small diameter high voltage insulated electric wire according to Example 2, in the determination of the wear resistance, since the index is 1.1, this small diameter high voltage insulated electric wire has suitable wear resistance. In the determination of the flexibility, since the index is 0.8, this small diameter high voltage insulated electric wire has suitable flexibility. Since the small diameter high voltage insulated electric wire according to Example 2 has been determined to be suitable based on all the test results, the composition of matter of the insulating layer used in this electric wire is suitable.

The characteristics of the composition of matter of the insulating layer of Example 2 that could achieve the target values of the wear resistance and the flexibility are as follows. The inverse $1/(\sigma f \cdot \epsilon)$ of the product of the tensile break strength $\sigma f$ and the break elongation $\epsilon$ is $3.5 \times 10^{-2}$. The value of the storage elastic modulus E is 860 MPa. The D hardness is 48.

Although the determination of the heat-resistant life is not shown in FIG. 1, since the temperature is 160° C. that is Class D or more specified by ISO-6722-1, the small diameter high voltage insulated electric wire according to Example 2 has a suitable heat-resistant life.

Example 3

The small diameter high voltage insulated electric wire according to Example 3 contains, as an insulating layer, 55 parts by weight of ethylene-ethyl acrylate A (Rexpearl A1100; Japan Polyethylene Corporation) as ethylene copolymer resin, 45 parts by weight of high density polyethylene (HDPE) (Novatec HB120R; Japan Polyethylene Corporation) as polyethylene, and 20 parts by weight of silane coupling treated $Mg(OH)_2$ (V6; Konoshima Chemical Co., Ltd.) as metal hydroxide. The small diameter high voltage insulated electric wire according to Example 3 further contains a phenolic antioxidant (Irganox1010; BASF) and a phosphite antioxidant (IRGAFOS168; BASF) as an insulating layer.

As for the test results of the small diameter high voltage insulated electric wire according to Example 3, in the determination of the wear resistance, since the index is 1.6, this small diameter high voltage insulated electric wire has suitable wear resistance. In the determination of the flexibility, since the index is 1.0, this small diameter high voltage insulated electric wire has suitable flexibility. Since the small diameter high voltage insulated electric wire according to Example 3 has been determined to be suitable based on all the test results, the composition of matter of the insulating layer used in this electric wire is suitable.

The characteristics of the composition of matter of the insulating layer of Example 3 that could achieve the target values of the wear resistance and the flexibility are as follows. The inverse $1/(\sigma f \cdot \epsilon)$ of the product of the tensile break strength $\sigma f$ and the break elongation $\epsilon$ is $1.9 \times 10^{-2}$. The value of the storage elastic modulus E is 1012 MPa. The D hardness is 52.

Although the determination of the heat-resistant life is not shown in the drawings, since the temperature is 150° C. that is Class D or more specified by ISO-6722-1, the small diameter high voltage insulated electric wire according to Example 3 has a suitable heat-resistant life.

Comparative Example 1

The small diameter high voltage insulated electric wire according to Comparative Example 1 contains, as an insulating layer, 75 parts by weight of ethylene-ethyl acrylate B (Elvaloy 2116AC; Du Pont-Mitsui Polychemicals Co., Ltd.) as ethylene copolymer resin, 25 parts by weight of high density polyethylene (HDPE) (Novatec HB120R; Japan Polyethylene Corporation) as polyethylene, and 20 parts by weight of silane coupling treated $Mg(OH)_2$ (V6; Konoshima Chemical Co., Ltd.) as metal hydroxide. The small diameter high voltage insulated electric wire according to Comparative Example 1 further contains a phenolic antioxidant (Irganox1010; BASF) and a phosphite antioxidant (IRGAFOS168; BASF) as an insulating layer.

As for the test results of the small diameter high voltage insulated electric wire according to Comparative Example 1, in the determination of the wear resistance, since the index is 0.9, this small diameter high voltage insulated electric wire does not have suitable wear resistance. In the determination of the flexibility, since the index is 0.7, this small diameter high voltage insulated electric wire has suitable flexibility. Since the small diameter high voltage insulated electric wire according to Comparative Example 1 is not suitable based on the test results of the heat-resistant life and the wear resistance, the composition of matter of the insulating layer used in this electric wire is not suitable.

The characteristics of the composition of matter of the insulating layer of Comparative Example 1 that could not achieve the target value 1.0 are as follows. The inverse $1/(\sigma f \cdot \epsilon)$ of the product of the tensile break strength $\sigma f$ and the break elongation $\epsilon$ is $5.2 \times 10^{-2}$. The value of the storage elastic modulus E is 400 MPa. The D hardness is 44.

Although the determination of the heat-resistant life is not shown in the drawings, since the temperature is 147° C. that is Class D or less specified by ISO-6722-1, the small diameter high voltage insulated electric wire according to Comparative Example 1 does not have a suitable heat-resistant life.

Comparative Example 2

The small diameter high voltage insulated electric wire according to Comparative Example 2 contains, as an insulating layer, 90 parts by weight of ethylene-ethyl acrylate B (Elvaloy 2116AC; Du Pont-Mitsui Polychemicals Co., Ltd.) as ethylene copolymer resin, 10 parts by weight of high density polyethylene (HDPE) (Novatec HB120R; Japan Polyethylene Corporation) as polyethylene, and 20 parts by weight of silane coupling treated $Mg(OH)_2$ (V6; Konoshima Chemical Co., Ltd.) as metal hydroxide. The small diameter high voltage insulated electric wire according to Comparative Example 2 further contains a phenolic antioxidant (Irganox1010; BASF) and a phosphite antioxidant (IRGAFOS168; BASF) as an insulating layer.

As for the test results of the small diameter high voltage insulated electric wire according to Comparative Example 2, in the determination of the wear resistance, since the index is 0.7, this small diameter high voltage insulated electric wire does not have suitable wear resistance. In the determination of the flexibility, since the index is 0.5, this small diameter high voltage insulated electric wire has suitable flexibility. Since the small diameter high voltage insulated electric wire according to Comparative Example 2 is not suitable based on the test result of the wear resistance, the composition of matter of the insulating layer used in this electric wire is not suitable.

The characteristics of the composition of matter of the insulating layer of Comparative Example 2 that could not achieve the target value 1.0 are as follows. The inverse $1/(\sigma f \cdot \epsilon)$ of the product of the tensile break strength $\sigma f$ and the break elongation $\epsilon$ is $5.5 \times 10^{-2}$. The value of the storage elastic modulus E is 338 MPa. The D hardness is 41.

Although the determination of the heat-resistant life is not shown in the drawings, since the temperature is 130° C. or less that is Class D or less specified by ISO-6722-1, the small diameter high voltage insulated electric wire according to Comparative Example 2 does not have a suitable heat-resistant life.

Comparative Example 3

The small diameter high voltage insulated electric wire according to Comparative Example 3 contains, as an insulating layer, 75 parts by weight of ethylene-ethyl acrylate A (Rexpearl A1100; Japan Polyethylene Corporation) as ethylene copolymer resin, 25 parts by weight of high density polyethylene (HDPE) (Novatec HB120R; Japan Polyethylene Corporation) as polyethylene, and 20 parts by weight of silane coupling treated $Mg(OH)_2$ (V6; Konoshima Chemical Co., Ltd.) as metal hydroxide. The small diameter high voltage insulated electric wire according to Comparative Example 3 further contains a phenolic antioxidant (Irganox1010; BASF) and a phosphite antioxidant (IRGAFOS168; BASF) as an insulating layer.

As for the test results of the small diameter high voltage insulated electric wire according to Comparative Example 3, in the determination of the wear resistance, since the index is 2.3, this small diameter high voltage insulated electric wire has suitable wear resistance. In the determination of the flexibility, since the index is 1.8, this small diameter high voltage insulated electric wire does not have suitable flexibility. Since the small diameter high voltage insulated electric wire according to Comparative Example 3 is not suitable based on the test result of the flexibility, the composition of matter of the insulating layer used in this electric wire is not suitable.

The characteristics of the composition of matter of the insulating layer of Comparative Example 3 that could achieve the target value 1.0 of the wear resistance but could not achieve the target value of the flexibility are as follows. The inverse $1/(\sigma f \cdot \epsilon)$ of the product of the tensile break strength $\sigma f$ and the break elongation $\epsilon$ is $4.8 \times 10^{-2}$. The value of the storage elastic modulus E is 520 MPa. The D hardness is 45.

Although the determination of the heat-resistant life is not shown in the drawings, since the temperature is 155° C. that is Class D or more specified by ISO-6722-1, Comparative Example 3 has a suitable heat-resistant life.

Comparative Example 4

The small diameter high voltage insulated electric wire according to Comparative Example 4 contains, as an insulating layer, 90 parts by weight of ethylene-ethyl acrylate B (Elvaloy 2116AC; Du Pont-Mitsui Polychemicals Co., Ltd.) as ethylene copolymer resin, 10 parts by weight of high density polyethylene (HDPE) (Novatec HB120R; Japan Polyethylene Corporation) as polyethylene, and 20 parts by weight of silane coupling treated $Mg(OH)_2$ (V6; Konoshima Chemical Co., Ltd.) as metal hydroxide. The small diameter high voltage insulated electric wire according to Comparative Example 4 further contains a phenolic antioxidant (Irganox1010; BASF) and a phosphite antioxidant (IRGAFOS168; BASF) as an insulating layer.

As for the test results of the small diameter high voltage insulated electric wire according to Comparative Example 4, in the determination of the wear resistance, since the index is 1.2, this small diameter high voltage insulated electric wire has suitable wear resistance. In the determination of the flexibility, since the index is 1.0, this small diameter high voltage insulated electric wire has suitable flexibility. Since the small diameter high voltage insulated electric wire according to Comparative Example 4 has been determined to be suitable based on the test results of the wear resistance and the flexibility, the composition of matter of the insulating layer used in this electric wire is suitable.

The characteristics of the composition of matter of the insulating layer of Comparative Example 4 that could achieve the target values of the wear resistance and the flexibility are as follows. The inverse $1/(\sigma f \cdot \epsilon)$ of the product of the tensile break strength $\sigma f$ and the break elongation $\epsilon$ is $5.5 \times 10^{-2}$. The value of the storage elastic modulus E is 240 MPa. The D hardness is 38.

Although the determination of the heat-resistant life is not shown in the drawing, since the temperature is 130° C. or less that is Class D or less specified by ISO-6722-1, the small diameter high voltage insulated electric wire according to Comparative Example 4 does not have a suitable heat-resistant life.

The test results of Examples 1 to 3 and Comparative Examples 1 to 4 show that the characteristics of the small diameter high voltage insulated electric wire depend on a blending amount of each additive material and the insulator wall thickness.

The ethylene-ethyl acrylate A used in Examples 1 to 3 and Comparative Example 3 and the ethylene-ethyl acrylate B used in Comparative Examples 1, 2, and 4 differ in a content of a copolymer component with ethylene. In the ethylene-ethyl acrylate A, the content of the copolymer component with ethylene is less than 20% (preferably less than 16%), and in the ethylene-ethyl acrylate B, the content of the copolymer component with ethylene is 20% or more.

From the test results of Examples 1 to 3 and Comparative Example 4 and Comparative Examples 1, 2, and 3, the ethylene-ethyl acrylate A is more suitable, and as ethylene copolymer resin, it is preferable that the content of the copolymer component with ethylene is less than 20% (preferably less than 16%).

Although Comparative Examples 2 and 4 have the same composition, the evaluation results of Comparative Examples 2 and 4 differ due to a difference in the insulator wall thickness of the electric wire. As for the characteristics achieved when the insulator wall thickness is conventional wall thickness (nominally 0.7 mm), it is found that when the insulator wall thickness is reduced (nominally 0.4 mm), the heat-resistant life is shortened, the wear resistance is deteriorated, and the flexibility is improved.

As described above, if the insulator wall thickness is large, the test of the wear resistance as an electric wire is passed. However, in view of only an insulator material, the insulating material of Comparative Example 4 has poor wear resistance. Namely, if the insulating material has a large wall thickness, the target value is achieved because of the structure of the electric wire; however, if the same material is reduced in wall thickness, the wear resistance does not reach the target value.

Accordingly, in the present embodiment, while there has been only a material for large wall thickness, a material which can be reduced in wall thickness while satisfying the same characteristics as the material for large wall thickness is used in the insulating layer.

On the other hand, if a material for thin-walled insulating layer is used as a material for thick-walled insulating layer, the flexibility does not satisfy the target value, as shown in Comparative Example 3. The flexibility is obtained by adding the thickness reducing effect to the effect of selected materials. Namely, the wear resistance and the flexibility are affected by not only the characteristics of materials but also a change in a structure of an electric wire (large wall thickness or small wall thickness).

Thus, in the small diameter high voltage insulated electric wire according to the embodiment of the present invention, a conductor is covered by an insulating layer. The insulating layer contains a copolymer resin of ethylene and acrylic ester and polyethylene and is a composition of matter in which if tensile break strength is of (MPa) and break elongation is $\epsilon$, an inverse $1/(\sigma f \cdot \epsilon)$ of a product of the tensile break strength of and the break elongation $\epsilon$ is $4.8 \times 10^{-2}$ or less, the value of storage elastic modulus E is 520 MPa or more, and the D hardness is 45 or more.

Since the small diameter high voltage insulated electric wire according to the embodiment of the present invention maintains high heat resistance of Class D specified by ISO-6722-1, the small diameter high voltage insulated electric wire can be used as a low-cost and highly functional high voltage wire for hybrid vehicles, plug-in hybrid vehicles, and electric vehicles. Since the characteristics satisfy ISO-6722-1, there is no concern about the quality in practical use.

Since the small diameter high voltage insulated electric wire according to the embodiment of the present invention contains no environmental load substance, the small diameter high voltage insulated electric wire is environment-friendly and has excellent recyclability.

According to the small diameter high voltage insulated electric wire according to the embodiment of the present invention, although the wall thickness of the insulating layer is small, the quality in ISO-6722-1 can be maintained by optimizing resin, kinds of flame retardants, and an additive amount. In this small diameter high voltage insulated electric wire, the wire diameter is narrowed, and the insulating layer is reduced in wall thickness, compared with conventional high voltage wires; therefore, this electric wire is lightweight and can be miniaturized, thus contributing to weight saving and miniaturization of a vehicle. The small diameter high voltage insulated electric wire maintains high flexibility while maintaining the quality in ISO-6722-1, thus increasing flexibility in design and, in addition, contributing to efficiency of wiring operation, and thereby contributing to reduction in manufacturing cost of a vehicle.

Other Embodiments

Although the present invention has been described with reference to the embodiment, it should not be understood that the descriptions and the drawings constituting a part of this disclosure will limit the scope of this invention. It will be obvious from this disclosure to those skilled in the art to find various alternative embodiments, examples and applied techniques.

For example, although ethylene-acrylic ester is exemplified as ethylene copolymer resin as base resin, ethylene copolymer resin is not limited to only this example. Examples of ethylene copolymer resin include an ethylene-vinyl ester copolymer and an ethylene-$\alpha,\beta$-unsaturated carboxylic acid alkyl ester copolymer.

Examples of a vinyl ester monomer used in an ethylene-vinyl ester copolymer include vinyl acetate, vinyl propionate, vinyl caproate, vinyl caprylate, vinyl laurate, vinyl stearate, and vinyl trifluoroacetate. One kind of or a mixture of two or more kinds of them may be used. Among those monomers, preferred are an ethylene-vinyl acetate copolymer (EVA) and so on.

Examples of an $\alpha,\beta$-unsaturated carboxylic acid alkyl ester monomer used in an ethylene-$\alpha,\beta$-unsaturated carboxylic acid alkyl ester copolymer include methyl acrylate, ethyl acrylate, butyl acrylate, methyl methacrylate, ethyl methacrylate, and butyl methacrylate. One kind of or a mixture of two or more kinds of them may be used. Among those monomers, preferred are an ethylene-ethyl acrylate copolymer (EEA), an ethylene-methyl acrylate copolymer (EMA), and so on.

As described above, it should be understood that the present invention includes various embodiments not described in this specification. Therefore, the present invention is limited by only specific matters relating to claims of the invention, which are introduced appropriately from the disclosure of the invention.

What is claimed is:

1. A small diameter high voltage insulated electric wire including a conductor covered with an insulating layer, wherein
   the insulating layer contains a copolymer resin of ethylene and acrylic ester and polyethylene,
   when of (MPa) denotes a tensile break strength and $\epsilon$ denotes a break elongation, the insulating layer is a composition having a product $1/(\sigma f \cdot \epsilon)$ of the inverse of the tensile break strength of and the inverse of the break elongation $\epsilon$ being $4.8 \times 10^{-2}$ or less, and having a value of storage elastic modulus E being 520 MPa or more, and having a D hardness being 45 or more, and
   the insulating layer further contains a metal hydroxide as flame retardant.

2. The small diameter high voltage insulating electric wire according to claim 1, wherein the insulating layer, contains 0 part by weight or more and 50 parts by weight or less of polyethylene, 50 parts by weight or more and 90 parts by weight or less of ethylene-ethyl acrylate copolymer resin, and 0 part by weight or more and 20 parts by weight or less of modified polyethylene, and 10 to 60 parts by weight of the metal hydroxide.

3. The small diameter high voltage insulating electric wire according to claim 1, wherein the metal hydroxide is magnesium hydroxide.

* * * * *